(12) United States Patent  
Shaker et al.

(10) Patent No.: US 8,056,949 B1  
(45) Date of Patent: Nov. 15, 2011

(54) UNIVERSAL GRIPPER BLOCK FOR A ROBOTIC ARM

(75) Inventors: Adam M. Shaker, Waldorf, MD (US); Todd J. Zimmerman, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 541 days.

(21) Appl. No.: 12/283,781

(22) Filed: Sep. 11, 2008

(51) Int. Cl.
*B23Q 3/155* (2006.01)
*B25J 15/04* (2006.01)

(52) U.S. Cl. .......... 294/213; 294/86.4; 294/902; 901/41

(58) Field of Classification Search .................... 294/1.1, 294/86.4, 902; 901/39, 41, 50; 483/901, 483/902
See application file for complete search history.

(56) References Cited

U.S. PATENT DOCUMENTS

| | | | |
|---|---|---|---|
| 3,122,234 A | | 2/1964 | Kagley |
| 4,561,506 A | * | 12/1985 | Booker ............................ 173/39 |
| 4,660,274 A | * | 4/1987 | Goumas et al. ................... 483/7 |
| 4,784,421 A | * | 11/1988 | Alvite ......................... 294/86.4 |
| 4,905,938 A | * | 3/1990 | Braccio et al. ................. 244/101 |
| 5,219,318 A | * | 6/1993 | Vranish .......................... 483/16 |
| 5,256,128 A | * | 10/1993 | Neumann ......................... 483/1 |
| 5,458,384 A | * | 10/1995 | Liu et al. ........................ 294/1.1 |
| 5,466,025 A | * | 11/1995 | Mee ............................... 294/1.1 |
| 5,853,211 A | | 12/1998 | Sawdon et al. |
| 5,938,259 A | | 8/1999 | Sawdon et al. |
| 5,993,365 A | * | 11/1999 | Stagnitto et al. ................ 483/59 |
| 7,008,362 B2 | * | 3/2006 | Fitzgibbon ........................ 483/9 |

OTHER PUBLICATIONS

Adam M. Shaker, www.manufacturing.com, Jun. 14, 2007. "request for production of prototype based on the attached structural figures without the figures referencing a robot gripper block."

* cited by examiner

*Primary Examiner* — Dean Kramer
(74) *Attorney, Agent, or Firm* — Fredric J. Zimmerman

(57) ABSTRACT

A robot gripper block is provided that facilitates the simultaneous attached of robot deployed tools to a plurality of distinct robot platforms having robot grippers with opposing moveable fingers. The block includes a plurality of parallel cylindrical sockets passing through the block to accept the complementary cylindrical bars of the robot deployed tools. A set pin is inserted through the block and tools to secure the tools in the block. Running along the faces of the block and arranged in pairs are channels sixed and shaped to complement the fingers of the robot grippers. Each set of channels is arranged for a given robot gripper.

12 Claims, 4 Drawing Sheets

UNIVERSAL GRIPPER BLOCK FOR A ROBOTIC ARM

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The present invention is directed to robotics and in particular to gripper assemblies for robots.

BACKGROUND OF THE INVENTION

Robots are used in many applications including manufacturing, tactical and law enforcement. For tactical or law enforcement applications, robots are used to enter hazardous areas including areas that are in close proximity to explosive devices and areas proximate to armed, hostile enemies. A robot includes all of the systems necessary to perform the desired functions. For example, ambulatory robots include a propulsion mechanism such as wheels or treads. Other systems include communication systems and video equipment. In order to manipulate the environment near the robot, each robot typically includes at least one extensible and maneuverable arm. At then end of each arm is some type of gripping mechanism that can be used to hold and when desired to release tools or other items transported by the robot.

These gripping mechanisms are typically referred to as robot grippers. Robot grippers are a type of end of arm tooling (EOAT) used to move parts from one location to another. They can be driven hydraulically, electrically, and pneumatically. A typical arrangement for robot grippers includes two prongs or fingers that move with respect to each other to grip and to release the desired objects. The internal gripping surfaces of these objects are often flat, making it difficult to grip or hold cylindrical objects or object having curved surfaces. The objects carried by robots are typically tools that include a universal type of interface or shape that is often a cylinder. To accommodate these shapes, gripper adaptors or blocks have been developed that hold the tools and provide for easier gripping by the robot grippers. These adaptors, however, are gripper specific. Therefore, adaptors are required for every type of robot or robot gripper that a given police force or tactical unit may have. This status increases cost, space requirements and operational time to switch tools between robots. Therefore, a robot gripper adaptor is required that can be used to mount a given set of tools on various robot gripper platforms.

SUMMARY OF THE INVENTION

The present invention is directed to a universal gripper block that is a machined block of acetal resin with multiple sets of channels sized and shaped to accommodate a plurality of distinct robot grippers from different robot platforms. In one embodiment, two sets of channels are provided on the block. Each set of channels is unique to robotic arm grippers, for example, matching numerous robots, including currently fielded EOD robots, MK1, MOD 0 and MK2, MOD 0. These robots are commercially available under various Tradenames. The center portion of the block includes 3 circular or cylindrical sockets to allow up to three robot deployed tools to be simultaneously employed. Therefore, one gripper block can be used to hold multiple tools on multiple separate and distinct robot platforms.

In one embodiment, the present invention is directed to a robot gripper adaptor constructed from a single unitary block constructed from acetal resin or polyoxymethlynene. This block includes a plurality of identical sockets passing through the block. Each socket has a size and a shape corresponding to a standardized bar on robot deployed tools. In one embodiment, the sockets are in the form of cylindrical shafts, and the corresponding standardized bar is a complementary cylindrical bar. In one embodiment, the plurality of identical sockets is parallel. Although the sockets may be formed partially through the block, in an exemplary embodiment, each socket passes completely through the block and includes two openings on opposing faces of the block to accept the standardized bar on robot deployed tools. In an exemplary embodiment, three sockets are provided in the block. The block may also include a plurality of holes in the plurality of sockets aligned to accommodate the passage of a single set pin through all of the sockets to engage the standardized bars on the robot deployed tools and to secure the tools in the sockets.

The block also includes a plurality of pairs of channels. Each channel runs along a face of the block, and each pair of channels is associated with a distinct two-finger robot gripper such that the channels in a given pair of channels are disposed on opposing faces of the block to accommodate opposing fingers of the associated two-finger robot gripper. The channels in the given pair have a complementary shape to each opposing finger of the associated two-finger robot gripper. In one embodiment, the plurality of pairs of channels includes two pairs of channels. Each one of the four channels constituting the two pairs of channels occupies a separate face of the block. In one embodiment, each channel runs an entire length of the face of block on which it is located. To facilitate acceptance of the associated robot gripper finger, each channel can include a flared opening. In one embodiment, the channels in a first pair of channels have a rectangular cross section, and the channels in a second pair of channels have a width that decreases from one end of the channel to another end.

DETAILED DESCRIPTION

Figure 1:
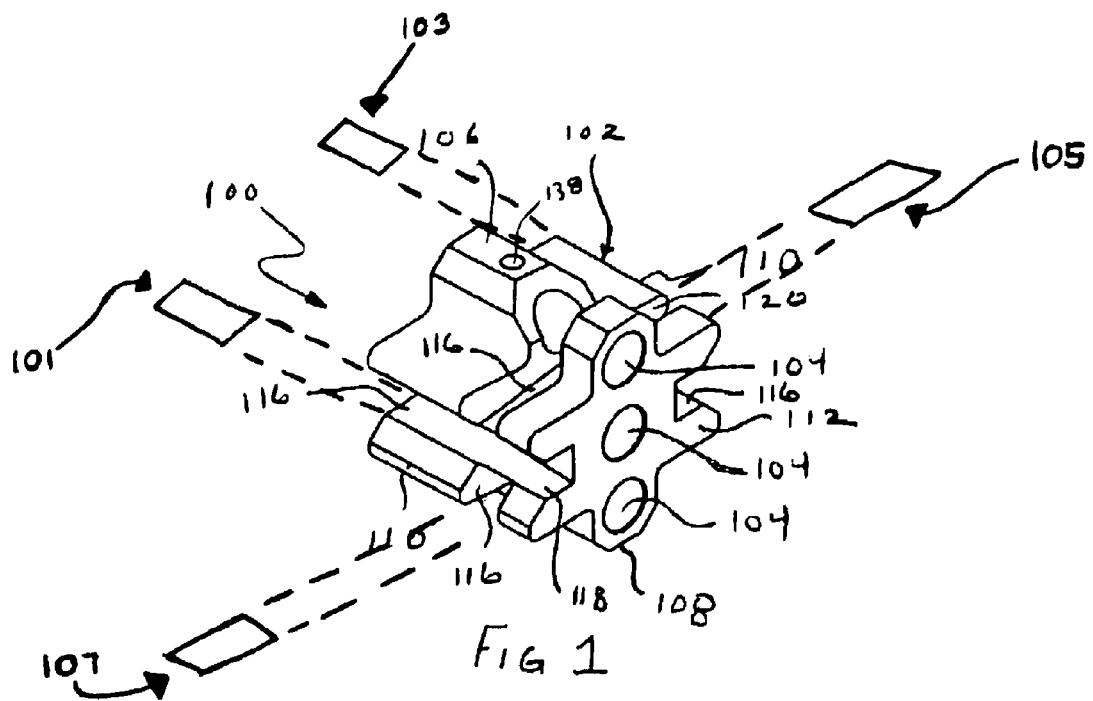
FIG. 1 is top perspective view of an embodiment of a robot gripper adaptor in accordance with the present invention.

Referring initially to FIG. 1, an exemplary embodiment of a robot gripper adaptor 100 in accordance with the present invention is illustrated. The robot gripper adaptor is a universal or multi-use adaptor that can be used interchangeably with a plurality of distinct robot platforms to secure one or more robot deployed tools to the robot platform. Suitable robot platforms are known and available in the art. In general, these robot platforms include a propulsion mechanism, at least one moveable arm and a robot gripper attached to the end of the moveable arm. The robot gripper includes at least two opposable fingers 101, 103, 105, 107, than move relative to each other between an open position and a closed position. The fingers are used to grasp and to transport items for use or deployment with the robot platform. The robot gripper adaptor is configured to be grasped and released by the opposable, moveable fingers of the robot gripper and to hold an assortment of robot deployed tools such as probes. Therefore, the robot deployed tools are adapted for secure gripping by robot grippers from two or more robot platforms. Suitable materials for the robot gripper adaptor include metals such as stainless steel, plastics, polymers, ceramics and combinations thereof. In an exemplary embodiment, the robot gripper adaptor is constructed from an acetal resin or polyoxymethylene, which is commercially available under the tradename Delrin® from E. I. du Pont de Nemours and Company of Wilmington, Del.

In one embodiment, the robot gripper adaptor of the present invention is formed as a block 102 of material. Although the block may be formed from a plurality of smaller parts joined together, the block, in an exemplary embodiment, is formed, machined or molded as a single unitary block of material. This construction configuration provides added strength to the block and eliminates any joints or lines that could be a point of fatigue and failure in the block. In one embodiment, the block includes a plurality of materials. In an exemplary embodiment, the block includes a single material, i.e., acetal resin or polyoxymethylene. In one embodiment, the block is generally shaped like a cube, having six faces. These faces include, generally, a top face 106, a bottom face 108 opposite the top face 106, two opposing sides faces 110, a front face 112 and a back face 114 (FIG. 3) opposite the front face. These faces may be substantially flat or planar, or can include shaping to remove sharp corners or eliminate excess material that contributes undesirable weight and cost to the robot gripper adaptor. As illustrated, the block is generally cubed shaped with excess material removed. Other suitable three dimensional shapes for the block include, but are not limited to, spheres, cylinders, cones, prisms, pyramids and solid shapes having more than six faces, for example, tetrahedrons, octahedrons and dodescadhedrons.

In an exemplary embodiment, the single unitary block includes a plurality of sockets 104 passing through the block. In an exemplary embodiment, the sockets are identical in shape. In general, the sockets have a size and a shape corresponding to a standardized bar on robot deployed tools. The standardized bars may be cylinders having a circular cross section or bars with a rectangular cross section or triangular cross section or any other suitable geometric shape. In an exemplary embodiment, the bars are cylindrical bars and the sockets are complementary cylindrical shafts. The length and diameter of the cylindrical bars are standardized to accommodate interchangeability among the robot deployed tools. In one exemplary embodiment, the block includes three sockets, although the block can include more or less sockets as desired. One of the three sockets is located generally in the center of one of the faces of the block, and the other two sockets are disposed on either side of the center socket, for example, so that the centers of the sockets fall in a line parallel to an edge of that face.

In one embodiment, the sockets pass completely through the block, for example from the front face 112 to the back face 114, and include openings on opposite sides of the block. Therefore, the bar of a single robot deployed tool can be passed completely through the block, or the bars of two separate robot deployed tools can be inserted into a single socket from opposite ends. In an exemplary embodiment, the sockets or cylindrical shafts are parallel. Therefore, the openings will appear on the same face, for sockets having only one opening each, or on two opposite faces, for sockets passing completely through the block. In one embodiment, the parallel sockets are also parallel to two opposite faces of the block and hence perpendicular to two opposing faces of the six-faced block. Alternatively, the parallel sockets are neither parallel nor perpendicular to any faces in the block, for example passing from the front face 112 to a side face 110 or the top or bottom faces.

The block also includes a plurality of channels 116 arranged in pairs. Each channel runs along a face of the block. In exemplary embodiment, each channel runs an entire length of the face of the block on which it is located. Each pair of channels is associated with a distinct two-finger robot gripper. Therefore, the channels 116 in a given pair of channels are disposed on opposing faces of the block to accommodate opposing fingers 101, 103, 105, 107 of the associated two-finger robot gripper. In addition to the location of the channels in a given pair of channels on opposing faces of the block, each channel 116 in a given pair of channels has a complementary shape to each opposing finger 101, 103, 105, 107 of the associated two-finger robot gripper. Therefore, the robot gripper fingers pressure fit into the channels 116 like fingers in a glove, minimizing slipping or movement of the block relative the robot gripper. In addition, each pair of opposing channels provides an accommodation for one type of two-fingered robot gripper. For example, a block with four pairs accommodates four different and distinct robot grippers. In one embodiment, the block includes two pairs 118, 120 of channels 116. Each one of the four channels combined constituting the two pairs of channels runs along a separate face of the block. Therefore in one embodiment, the pairs 118, 120 of channels are aligned and offset by a rotation of 90 degrees about an axis running through the center of the block, for example through the center socket in the three socket embodiment.

Figure 2:
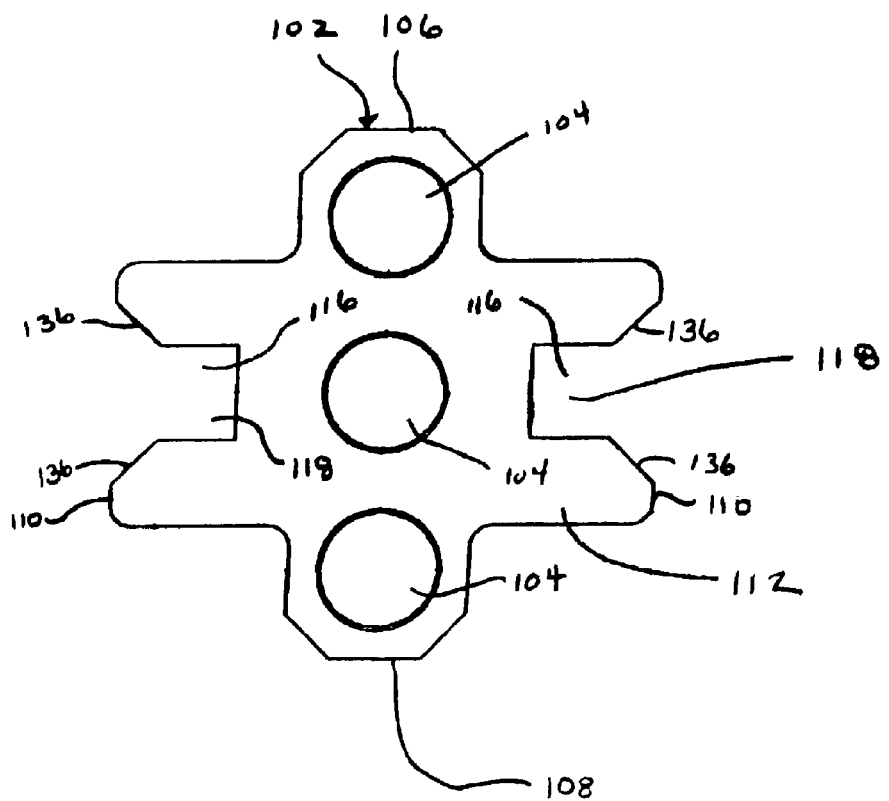
FIG. 2 is a front view of the embodiment of the robot gripper adaptor with dimensions given in inches.
Figure 7:
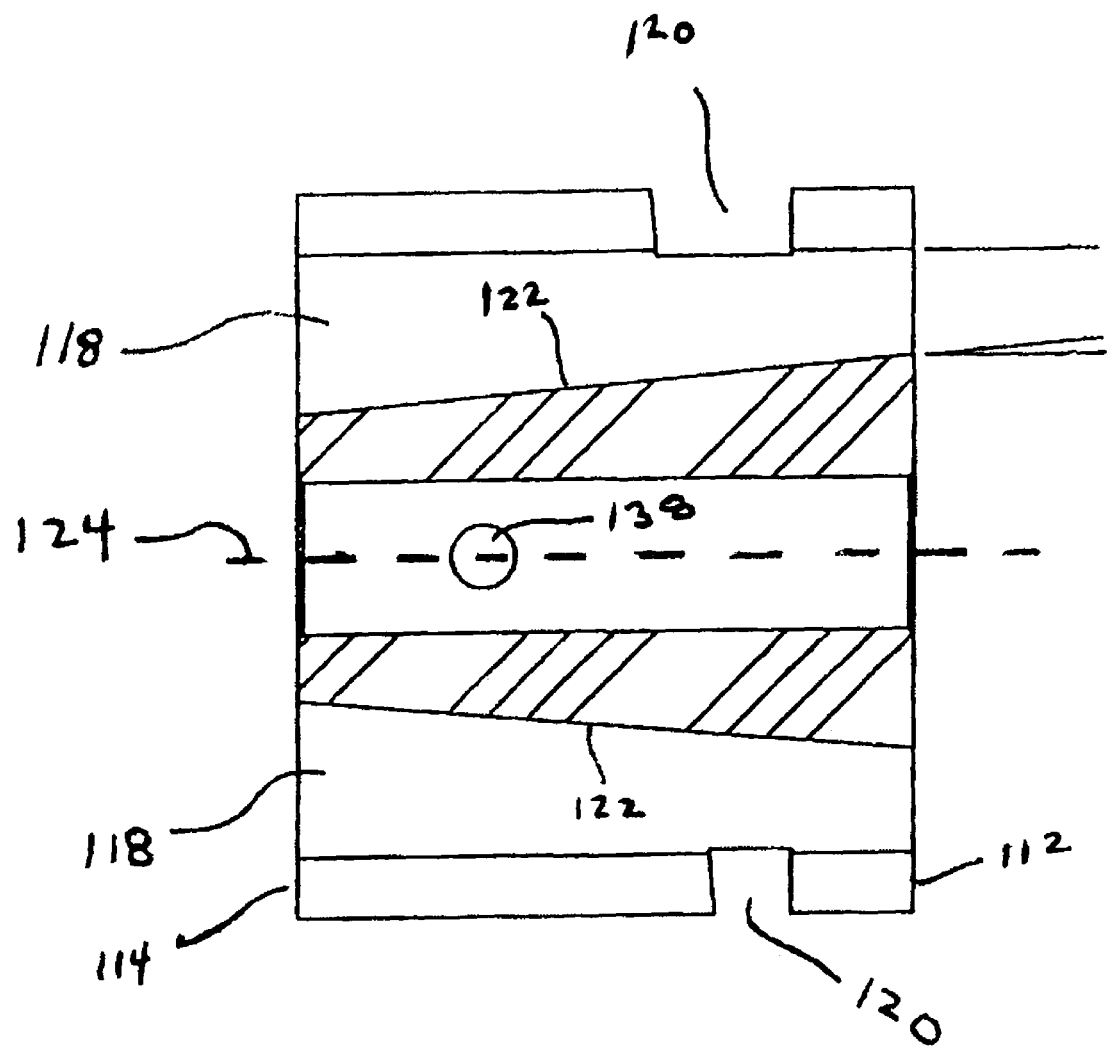
FIG. 7 is a view through line 7-7 of FIG. 5.

In an exemplary embodiment, the two pairs include a first pair 118 and a second pair 120 where the first pair 118, which accommodates opposing fingers 101, 103, is perpendicular to the second pair 120, which accommodates opposing fingers 105, 107. The channels 118 in the first pair of channels have a rectangular cross section of a constant width (FIG. 2) when viewed down the length of the channel, i.e., from either the front or back face. In one embodiment, the rectangular cross section is uniform along the entire length of the first channel. Alternatively, as illustrated in FIG. 7, the inner or bottom surface 122 of each channel in the first pair of channels is slanted from the back face 114 to the front face 112 with respect to a line running parallel to a central axis 124 of the block from the front face 112 to the back face 114. In one embodiment, this slant forms an angle of about 5 degrees with respect to the central axis 124. This slant compensates for either a change in the thickness of the fingers or the "V" shape of the robot gripper fingers due to how the fingers open by pivoting from a common point on one of the ends of the fingers.

Figure 3:
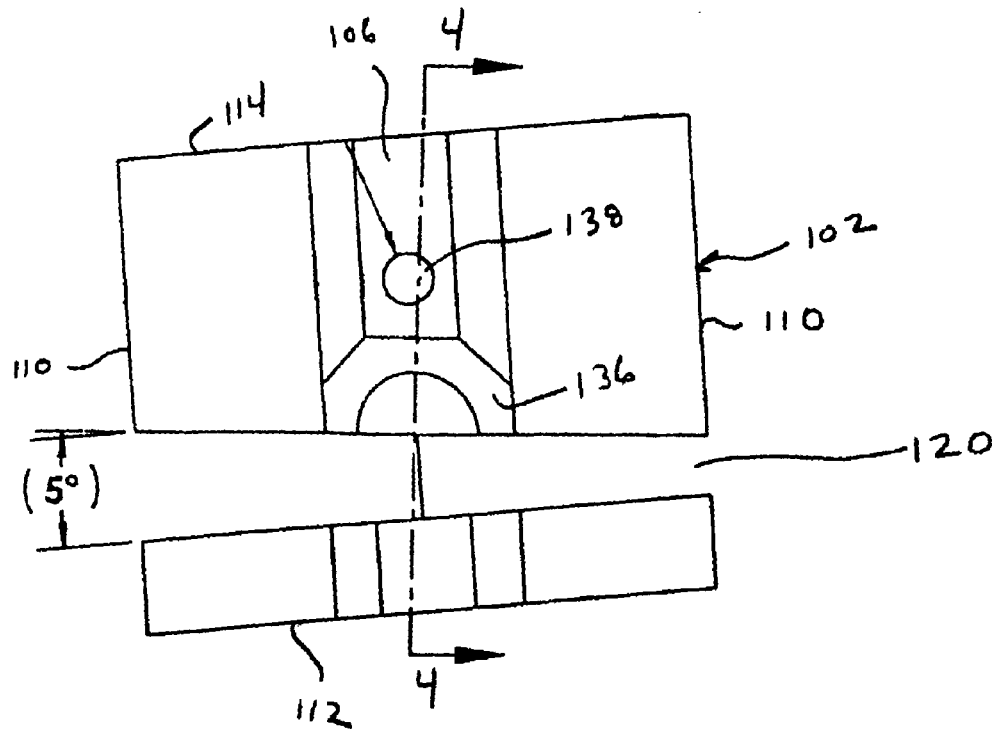
FIG. 3 is a top view of the embodiment of the robot gripper adaptor with dimensions given in inches.
Figure 6:
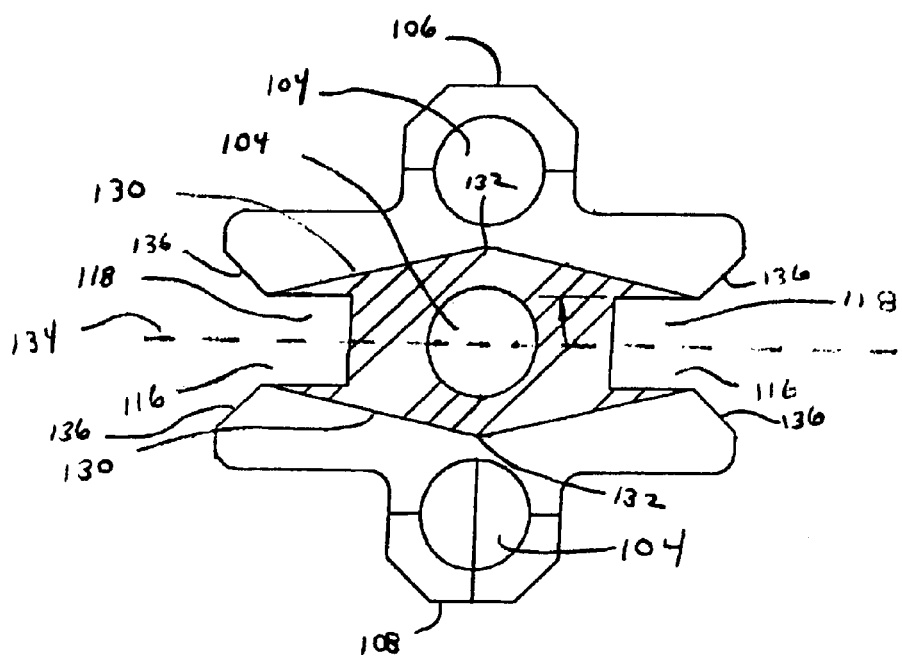
FIG. 6 is a view through line 6-6 of FIG. 5.

In an exemplary embodiment, both channels in the second pair of channels 120, although generally rectangular in cross section, comprise a width that decreases from one end of the channel to the other end, that is from one side face to the other side face, as illustrated, for example, in FIG. 3. In one embodiment, this change in width represents an angle of about 5 degrees with respect to a line parallel to either the front or back face of the block. This angular decrease in width complements a robot gripper finger that tapers from its pivot point to its distal end. In addition, the opposing faces of the robot gripper fingers can be bowed or bent outward. This configuration may accommodate, for example, the gripping of a round or cylindrical object. Therefore as illustrated in FIG. 6, the channels in the second set of channels include a bottom or inner surface 130 that is bowed in the middle or rises from the ends to a central peak 132. The particular profile of the bottom surface corresponds to the shape of the interior surfaces of the robot gripper fingers. In one embodiment, the bottom surface is constructed as two slanting surfaces that rise to the center point 132. In one embodiment each slanting surface forms an angle of about 13 degrees with an axis 134 running through the center of the block between the two side faces. In an exemplary embodiment, each finger of the robot gripper fingers 101,403, 105, 107 are angled to 90 degrees and taper off while approaching the end of the robot gripper finger. In another exemplary embodiment, each finger of the robot gripper fingers 101, 103, 105, 107 is straight out and has a radius on the inside of each finger further this finger also has a square block at an end to serve as a gripper pad (not shown).

In one embodiment, each channel in the plurality of channels includes a flared opening to facilitate acceptance of the associated robot gripper finger. For example, the opposing edges of the opening of each channel include a beveled, slanted or chamfered surface 136. This surface can be formed as a cut of 45 degrees with respect to the face of the block adjacent that edge of the channel. Other shapes for the edges can also be used, provided that those shapes help to guide the robot arms into engagement with the channels.

Figure 4:
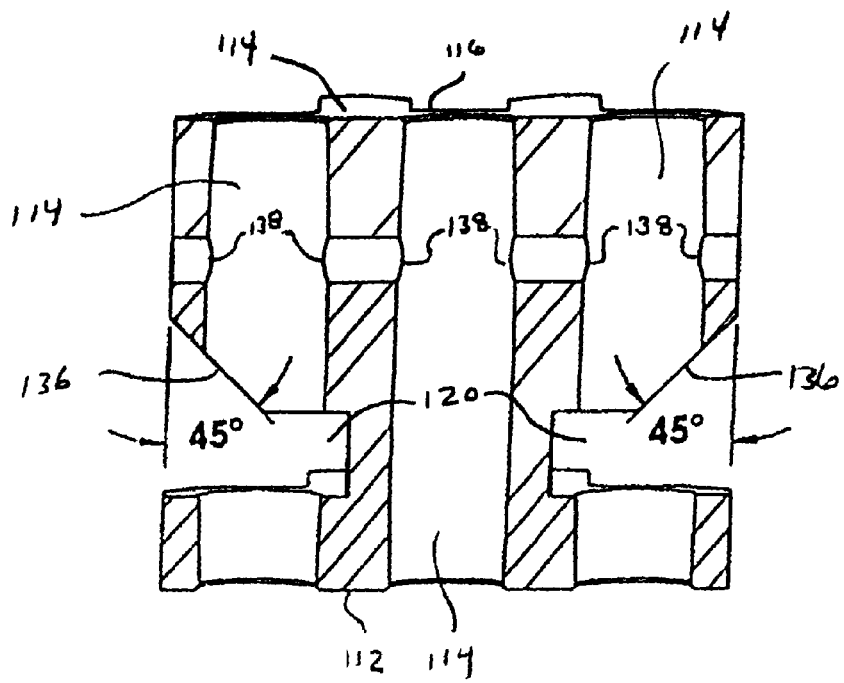
FIG. 4 is a view through line 4-4 of FIG. 3.
Figure 5:
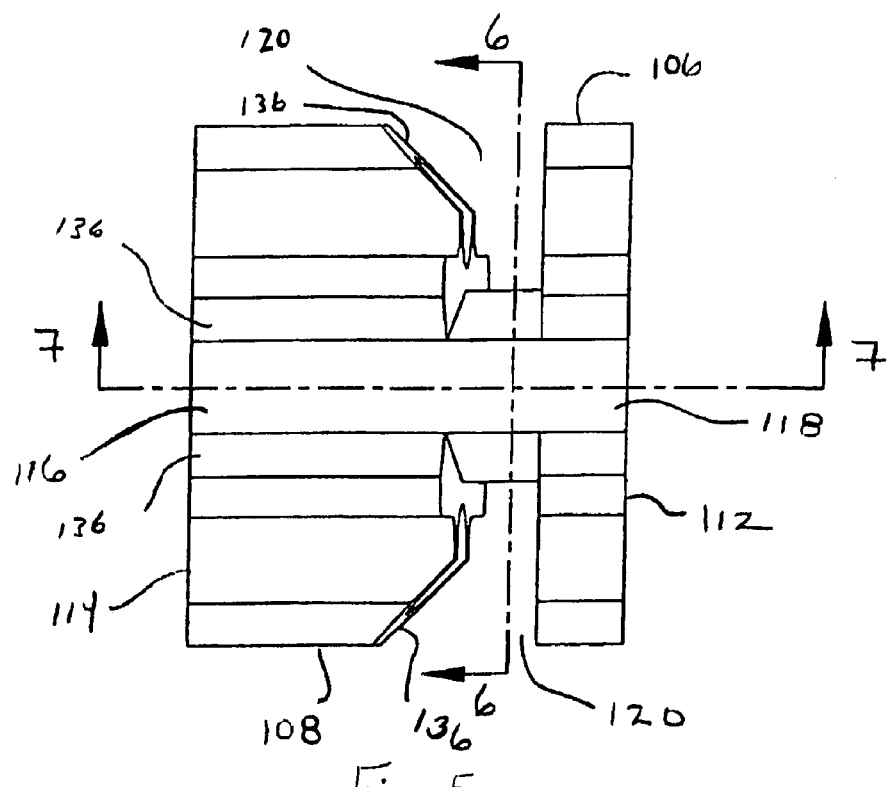
FIG. 5 is a side view of the embodiment of the robot gripper adaptor with dimensions given in inches.

As is best illustrated in FIG. 4, a plurality of holes 138 are provided in the plurality of sockets 104, and the holes are aligned to accommodate the passage of a single set pin (not shown) through all of the sockets. Therefore, the holes align to form a shaft or passage for the set pin. When the bar of a robot deployed tool is inserted into a socket, a notch or hole in the bar is aligned with the holes in the sockets, so that the set pin can be inserted through the holes and the bar to engage the standardized bars on the robot deployed tool and to secure the tool in the socket.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A robot gripper system, comprising:
  a robot comprising a distinct two-finger robot gripper, wherein said distinct two-finger robot gripper comprises two robot gripper fingers; and
  a gripper adaptor comprising a unitary block comprising a plurality of identical sockets passing through the unitary block, wherein each socket comprises a size and a shape corresponding to a standardized bar on robot deployed tools,
    wherein said unitary block comprises a plurality of pairs of channels where each channel of the plurality of pairs of channels runs along a face of the unitary block,
    wherein each pair of channels of the plurality of pairs of channels is associated with said distinct two-finger robot gripper such that channels of said each pair of channels are disposed on opposing faces of the unitary block to accommodate opposing said two robot gripper fingers of the associated two-finger robot gripper, and
    wherein the channels in a given pair comprise a complementary shape to each of said opposing two robot gripper finger of the associated two-finger robot gripper.

2. The system of claim 1, wherein the plurality of identical sockets comprise cylindrical shafts and the corresponding standardized bar comprises a complementary cylindrical bar.

3. The system of claim 1, wherein the plurality of identical sockets are parallel.

4. The system of claim 1, wherein said each socket passes completely through the block and comprises two openings on opposing faces of the unitary block to accept the standardized bar on robot deployed tools.

5. The system of claim 1, wherein the plurality of identical sockets further comprises three sockets.

6. The system of claim 1, further comprising a plurality of holes in the plurality of sockets being aligned for accommodating passage of a single set pin through all of theplurality of sockets for engaging each said standardized bars on the robot deployed tools and for securing the robot deployed tools in the plurality of sockets.

7. The system of claim 1, wherein the plurality of pairs of channels comprises two pairs of channels, and wherein each one of four channels constitutes the two pairs of channels, which occupy a separate face of the block.

8. The system of claim 7, wherein the channels in a first pair of channels comprise a rectangular cross section and the channels in a second pair of channels comprise a width that decreases from one end of the channel to another end.

9. The system of claim 1, wherein said each channel runs an entire length of the face of the block on which it is located.

10. The system of claim 1, wherein each channel comprises a flared opening to facilitate acceptance of one of the two robot gripper fingers.

11. The system of claim 1, wherein the block comprises polyoxymethlynene.

12. The system of claim 1, further comprising a plurality of holes in a plurality of cylindrical shafts being aligned to for accommodating passage of a single set pin through all of the plurality of cylindrical shafts for engaging the standardized bare on the robot deployed tools and for securing the robot deployed tools in the cylindrical shafts.

* * * * *